United States Patent
Yerramalli et al.

(10) Patent No.: US 10,341,960 B2
(45) Date of Patent: Jul. 2, 2019

(54) HANDLING TRANSMISSIONS AFTER PAUSE IN ELAA

(71) Applicant: QUALCOMM Incorporated, San Diego, CA (US)

(72) Inventors: Srinivas Yerramalli, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/710,603

(22) Filed: Sep. 20, 2017

(65) Prior Publication Data

US 2018/0092043 A1 Mar. 29, 2018

Related U.S. Application Data

(60) Provisional application No. 62/398,750, filed on Sep. 23, 2016.

(51) Int. Cl.
| | | |
|---|---|---|
| *H04W 52/14* | (2009.01) | |
| *H04L 5/00* | (2006.01) | |
| *H04W 52/34* | (2009.01) | |
| *H04W 16/16* | (2009.01) | |
| *H04W 28/02* | (2009.01) | |
| *H04W 28/26* | (2009.01) | |
| *H04W 72/04* | (2009.01) | |

(Continued)

(52) U.S. Cl.
CPC .......... *H04W 52/146* (2013.01); *H04L 5/005* (2013.01); *H04W 16/16* (2013.01); *H04W 28/021* (2013.01); *H04W 28/26* (2013.01); *H04W 52/343* (2013.01); *H04W 72/0413* (2013.01); *H04W 72/14* (2013.01); *H04W 74/0808* (2013.01); *H04W 74/0816* (2013.01)

(58) Field of Classification Search
CPC .... H04L 5/005; H04W 16/16; H04W 28/021; H04W 28/26; H04W 52/146; H04W 52/343; H04W 72/0413; H04W 72/14; H04W 74/0808; H04W 74/0816
USPC ... 455/464, 522, 454, 436, 41.2, 422.1, 450, 455/435.2, 509; 370/328, 336
See application file for complete search history.

(56) References Cited

U.S. PATENT DOCUMENTS 6,681,112 B1 * 1/2004 Schwarz ............... H04W 36/06
455/436
9,936,394 B2 * 4/2018 Zhang ................... H04W 16/14
(Continued)

OTHER PUBLICATIONS

"15 Channel Access Procedures for LAA," 3GPP Draft; 36213_CR0743R1_(REL-14)_D20_S15, 3rd Generation Partnership Project (3GPP), Mobile Competence Centre, 650, Route Des Lucioles, F-06921, Sophia-Antipolis Cedex, France, Sep. 21, 2016, XP051158272, Retrieved from the Internet: URL:http://www.3gpp.org/ftp/tsg_ran/WG1_RL1/TSGR1_86/Docs/ [retrieved on Sep. 21, 2016], pp. 335-345.

(Continued)

*Primary Examiner* — Tan H Trinh
(74) *Attorney, Agent, or Firm* — Liem T. Do

(57) ABSTRACT

Handling transmissions in enhanced license assisted access (eLAA) networks is discussed. Specifically, when pauses occur in transmissions on contention-based shared channels involved in eLAA communications, various procedures may be used to restart transmissions on the contention-based shared channels on the uplink when the original channel occupancy was reserved by a serving base station.

18 Claims, 15 Drawing Sheets

(51) Int. Cl.
*H04W 72/14* (2009.01)
*H04W 74/08* (2009.01)

(56) References Cited

U.S. PATENT DOCUMENTS

| | | | | |
|---|---|---|---|---|
| 2013/0201916 | A1* | 8/2013 | Kummetz | H04W 24/02 370/328 |
| 2015/0215082 | A1* | 7/2015 | Agiwal | H04L 1/1822 370/336 |
| 2015/0270932 | A1* | 9/2015 | Agiwal | H04L 1/1887 370/336 |
| 2016/0278078 | A1* | 9/2016 | Cheng | H04W 72/0446 |
| 2016/0278088 | A1* | 9/2016 | Cheng | H04L 47/27 |
| 2016/0360422 | A1* | 12/2016 | Zhang | H04W 16/14 |
| 2017/0013469 | A1* | 1/2017 | Larsson | H04W 16/14 |
| 2017/0188387 | A1* | 6/2017 | Mukherjee | H04W 74/0808 |
| 2017/0290059 | A1* | 10/2017 | Karaki | H04W 74/0816 |
| 2017/0317798 | A1* | 11/2017 | Kim | H04W 72/12 |
| 2017/0325258 | A1* | 11/2017 | Nogami | H04J 11/00 |
| 2017/0331577 | A1* | 11/2017 | Parkvall | H04J 11/0079 |
| 2017/0331670 | A1* | 11/2017 | Parkvall | H04J 11/0079 |
| 2017/0339721 | A1* | 11/2017 | Mukherjee | H04W 16/14 |
| 2017/0359808 | A1* | 12/2017 | Dinan | H04W 72/042 |
| 2018/0027582 | A1* | 1/2018 | Yerramalli | H04L 1/1825 370/336 |
| 2018/0123744 | A1* | 5/2018 | Nogami | H04W 52/146 |
| 2018/0191547 | A1* | 7/2018 | Mukherjee | H04L 27/2692 |
| 2018/0220457 | A1* | 8/2018 | Koorapaty | H04W 74/0808 |

OTHER PUBLICATIONS

International Search Report and Written Opinion—PCT/US2017/052693—ISA/EPO—dated Dec. 11, 2017.
Koorapaty H., "Status Report to TSG 1 Work Plan Related Evaluation", 3GPP Draft; TSG RAN WG1, RP-161581 , New Orleans, USA; Sep. 19, 2016-Sep. 22, 2016 Sep. 13, 2016, XP051146830,Retrieved from the Internet: URL:http://www.3gpp.org/ftp/Meetings_3GPP_SYNC/RAN/Docs/ [retrieved on Sep. 13, 2016], 12 pages.
Wilus Inc: "UL Multi-Carrier Transmission for eLAA", 3GPP Draft; R1-167788_UL_MCT, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 22, 2016-Aug. 26, 2016 Aug. 21, 2016, XP051140809, Retrieved from the Internet: URL:http://www.3gpp.org/ftp/Meetings_3GPP_SYNC/RAN1/Docs/ [retrieved on Aug. 21, 2016], 4 pages.

* cited by examiner

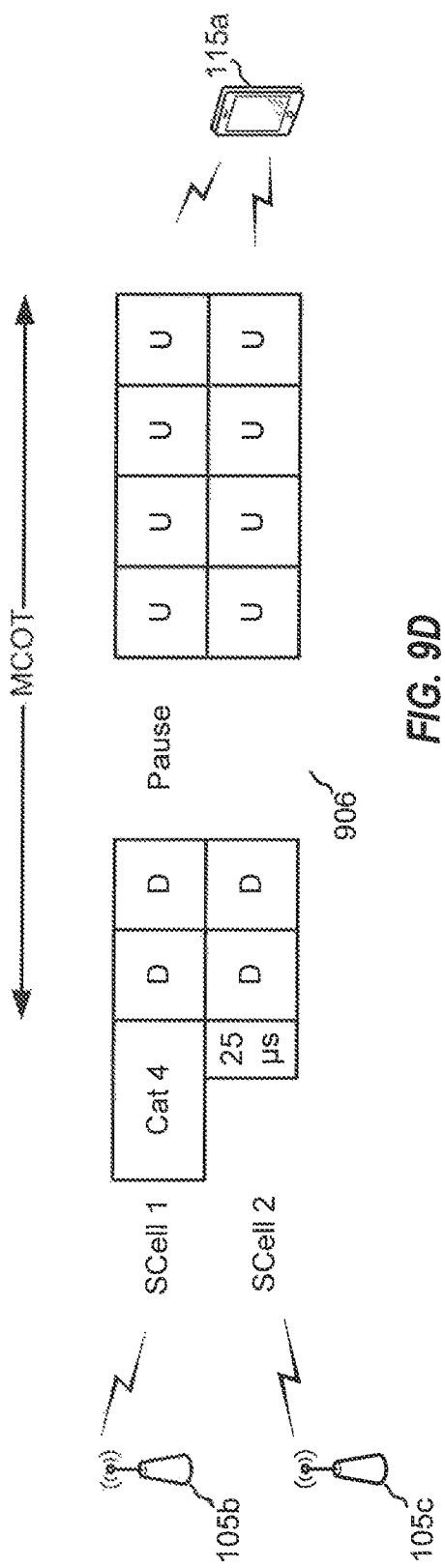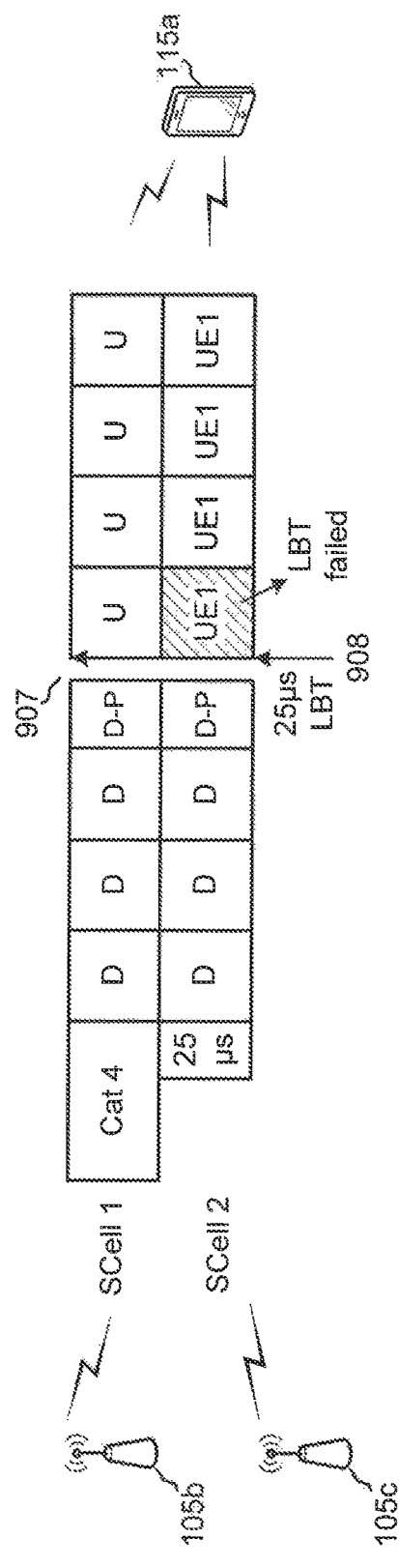
FIG. 9D
FIG. 9E

US 10,341,960 B2

HANDLING TRANSMISSIONS AFTER PAUSE IN ELAA

CROSS-REFERENCE TO RELATED APPLICATIONS

This application claims the benefit of U.S. Provisional Patent Application No. 62/398,750, entitled, "HANDLING TRANSMISSIONS AFTER PAUSE IN ELAA," filed on Sep. 23, 2016, which is expressly incorporated by reference herein in its entirety.

BACKGROUND

Field

Aspects of the present disclosure relate generally to wireless communication systems, and more particularly, to handling transmissions after pause in enhanced license assisted access (eLAA).

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

In one aspect of the disclosure, a method of wireless communication includes receiving a resource allocation for a contiguous transmission over a set of subframes on a secondary carrier including contention-based shared spectrum, initiating transmission on the secondary carrier, pausing transmission on the secondary carrier prior to completion of the contiguous transmission over the set of subframes of the resource allocation, resuming transmission of the contiguous transmission on the secondary carrier after the pausing in response to a successful full listen before talk (LBT) check, wherein the resuming reoccupies the secondary carrier without start of a new channel occupancy of the secondary carrier.

In an additional aspect of the disclosure, a method of wireless communication includes determining, at a base station, data for transmission to one or UEs, wherein the base station is part of a multi-carrier transmission network with contention-based shared spectrum, performing a LBT procedure at the base station prior to initiating transmission, wherein the LBT procedure is one of: a full LBT procedure, or a reduced LBT procedure, signaling a type indicator to the one or more UEs, wherein the type indicator identifies a type of the LBT procedure performed by the base station, and transmitting the data to the one or more UEs.

In an additional aspect of the disclosure, a method of wireless communication includes receiving an uplink grant at a UE from a base station in a multi-carrier transmission network with contention-based shared spectrum, receiving a LBT type indicator at the UE from the base station, wherein the LBT type indicator identifies a type of LBT procedure performed by the base station, detecting, by the UE, a transmission gap less than a predefined length on a contention-based shared carrier associated with the uplink grant, failing a first reduced LBT procedure at the UE for the contention-based shared carrier, performing a second LBT procedure at the UE in accordance with the LBT type indicator identifying a full LBT procedure performed by the base station, and dismissing, by the UE, a transmission attempt associated with the uplink grant in response to the LBT type indicator identifying a reduced LBT procedure performed by the base station.

In an additional aspect of the disclosure, a method of wireless communication includes receiving, at a UE, scheduling for transmission up to a predetermined maximum transmission length on a contention-based shared carrier, determining, by the UE, a gap in the scheduling, wherein the gap is greater than or equal to a predetermined minimum time, performing a reduced LBT procedure in response to an end of the gap, and resuming transmission after the gap in response to the reduced LBT procedure being successful.

In an additional aspect of the disclosure, a method of wireless communication includes receiving, at a UE, scheduling for transmission on a contention-based shared carrier of a multi-carrier communication network, determining a slot boundary on which the transmission is scheduled to begin, performing a full LBT procedure for the contention-based shared carrier before the slot boundary, determining the contention-based shared carrier is out of synchronization with one or more other carriers of the multi-carrier communication network, and delaying the transmission for a duration less than one slot from the slot boundary when the UE cannot begin the transmission on the slot boundary because the contention-based shared carrier is out of synchronization.

In an additional aspect of the disclosure, a method of wireless communication includes receiving, at a UE, scheduling for transmission on a contention-based shared carrier of a multi-carrier communication network, determining a slot boundary on which the transmission is scheduled to begin, performing a full LBT procedure for the contention-based shared carrier before the slot boundary, determining the contention-based shared carrier is out of synchronization with one or more other carriers of the multi-carrier communication network, and refraining from performing an LBT procedure between the slot boundary and an expected transmission time, wherein the expected transmission time is less than a duration of one slot from the slot boundary.

In an additional aspect of the disclosure, a method of wireless communication includes receiving an uplink grant at a UE from a base station for transmission on a contention-based shared spectrum, wherein the uplink grant includes a 4-bit indicator identifying a resource allocation, wherein the 4-bit indicator identifies contiguous interlace allocations of the resource allocation and an interlace configuration of the resource allocation, and sending, by the UE, the transmission according to the uplink grant.

In an additional aspect of the disclosure, a method of wireless communication includes receiving a common control signal from a base station including at least an uplink burst offset, an uplink burst duration, and partial subframe indicator, wherein the partial subframe indicator identifies a current subframe as an end partial subframe before start of an uplink burst, transmitting uplink data during a partial uplink portion of the current subframe after the receiving, and transmitting additional uplink data according to the common control signal.

In an additional aspect of the disclosure, an apparatus configured for wireless communication includes means for receiving a resource allocation for a contiguous transmission over a set of subframes on a secondary carrier including contention-based shared spectrum, means for initiating transmission on the secondary carrier, means for pausing transmission on the secondary carrier prior to completion of the contiguous transmission over the set of subframes of the resource allocation, means for resuming transmission of the contiguous transmission on the secondary carrier after the pausing in response to a successful full listen before talk (LBT) check, wherein the resuming reoccupies the secondary carrier without start of a new channel occupancy of the secondary carrier.

In an additional aspect of the disclosure, an apparatus configured for wireless communication includes means for determining, at a base station, data for transmission to one or UEs, wherein the base station is part of a multi-carrier transmission network with contention-based shared spectrum, means for performing a LBT procedure at the base station prior to initiating transmission, wherein the LBT procedure is one of: a full LBT procedure, or a reduced LBT procedure, means for signaling a type indicator to the one or more UEs, wherein the type indicator identifies a type of the LBT procedure performed by the base station, and means for transmitting the data to the one or more UEs.

In an additional aspect of the disclosure, an apparatus configured for wireless communication includes means for receiving an uplink grant at a UE from a base station in a multi-carrier transmission network with contention-based shared spectrum, means for receiving a LBT type indicator at the UE from the base station, wherein the LBT type indicator identifies a type of LBT procedure performed by the base station, means for detecting, by the UE, a transmission gap less than a predefined length on a contention-based shared carrier associated with the uplink grant, means for failing a first reduced LBT procedure at the UE for the contention-based shared carrier, means for performing a second LBT procedure at the UE in accordance with the LBT type indicator identifying a full LBT procedure performed by the base station, and means for dismissing, by the UE, a transmission attempt associated with the uplink grant in response to the LBT type indicator identifying a reduced LBT procedure performed by the base station.

In an additional aspect of the disclosure, an apparatus configured for wireless communication includes means for receiving, at a UE, scheduling for transmission up to a predetermined maximum transmission length on a contention-based shared carrier, means for determining, by the UE, a gap in the scheduling, wherein the gap is greater than or equal to a predetermined minimum time, means for performing a reduced LBT procedure in response to an end of the gap, and means for resuming transmission after the gap in response to the reduced LBT procedure being successful.

In an additional aspect of the disclosure, an apparatus configured for wireless communication includes means for receiving, at a UE, scheduling for transmission on a contention-based shared carrier of a multi-carrier communication network, means for determining a slot boundary on which the transmission is scheduled to begin, means for performing a full LBT procedure for the contention-based shared carrier before the slot boundary, means for determining the contention-based shared carrier is out of synchronization with one or more other carriers of the multi-carrier communication network, and means for delaying the transmission for a duration less than one slot from the slot boundary when the UE cannot begin the transmission on the slot boundary because the contention-based shared carrier is out of synchronization.

In an additional aspect of the disclosure, an apparatus configured for wireless communication includes means for receiving, at a UE, scheduling for transmission on a contention-based shared carrier of a multi-carrier communication network, means for determining a slot boundary on which the transmission is scheduled to begin, means for performing a full LBT procedure for the contention-based shared carrier before the slot boundary, means for determining the contention-based shared carrier is out of synchronization with one or more other carriers of the multi-carrier communication network, and means for refraining from performing an LBT procedure between the slot boundary and an expected transmission time, wherein the expected transmission time is less than a duration of one slot from the slot boundary.

In an additional aspect of the disclosure, an apparatus configured for wireless communication includes means for receiving an uplink grant at a UE from a base station for transmission on a contention-based shared spectrum, wherein the uplink grant includes a 4-bit indicator identifying a resource allocation, wherein the 4-bit indicator identifies contiguous interlace allocations of the resource allocation and an interlace configuration of the resource allocation, and means for sending, by the UE, the transmission according to the uplink grant.

In an additional aspect of the disclosure, an apparatus configured for wireless communication includes means for receiving a common control signal from a base station including at least an uplink burst offset, an uplink burst duration, and partial subframe indicator, wherein the partial subframe indicator identifies a current subframe as an end partial subframe before start of an uplink burst, means for transmitting uplink data during a partial uplink portion of the current subframe after the receiving, and means for transmitting additional uplink data according to the common control signal.

In an additional aspect of the disclosure, a non-transitory computer-readable medium having program code recorded thereon. The program code further includes code to receive a resource allocation for a contiguous transmission over a set of subframes on a secondary carrier including contention-based shared spectrum, code to initiate transmission on the secondary carrier, code to pause transmission on the secondary carrier prior to completion of the contiguous transmission over the set of subframes of the resource allocation, code to resume transmission of the contiguous transmission on the secondary carrier after the pausing in response to a successful full listen before talk (LBT) check, wherein the resuming reoccupies the secondary carrier without start of a new channel occupancy of the secondary carrier.

In an additional aspect of the disclosure, a non-transitory computer-readable medium having program code recorded thereon. The program code further includes code to determine, at a base station, data for transmission to one or UEs, wherein the base station is part of a multi-carrier transmission network with contention-based shared spectrum, code to perform a LBT procedure at the base station prior to initiating transmission, wherein the LBT procedure is one of: a full LBT procedure, or a reduced LBT procedure, code to signal a type indicator to the one or more UEs, wherein the type indicator identifies a type of the LBT procedure performed by the base station, and code to transmit the data to the one or more UEs.

In an additional aspect of the disclosure, a non-transitory computer-readable medium having program code recorded thereon. The program code further includes code to receive an uplink grant at a UE from a base station in a multi-carrier transmission network with contention-based shared spectrum, code to receive a LBT type indicator at the UE from the base station, wherein the LBT type indicator identifies a type of LBT procedure performed by the base station, code to detect, by the UE, a transmission gap less than a predefined length on a contention-based shared carrier associated with the uplink grant, code to detect failure of a first reduced LBT procedure at the UE for the contention-based shared carrier, code to perform a second LBT procedure at the UE in accordance with the LBT type indicator identifying a full LBT procedure performed by the base station, and code to dismiss, by the UE, a transmission attempt associated with the uplink grant in response to the LBT type indicator identifying a reduced LBT procedure performed by the base station.

In an additional aspect of the disclosure, a non-transitory computer-readable medium having program code recorded thereon. The program code further includes code to receive, at a UE, code to schedule for transmission up to a predetermined maximum transmission length on a contention-based shared carrier, code to determine, by the UE, a gap in the scheduling, wherein the gap is greater than or equal to a predetermined minimum time, code to perform a reduced LBT procedure in response to an end of the gap, and code to resume transmission after the gap in response to the reduced LBT procedure being successful.

In an additional aspect of the disclosure, a non-transitory computer-readable medium having program code recorded thereon. The program code further includes code to receive, at a UE, code to schedule for transmission on a contention-based shared carrier of a multi-carrier communication network, code to determine a slot boundary on which the transmission is scheduled to begin, code to perform a full LBT procedure for the contention-based shared carrier before the slot boundary, code to determine the contention-based shared carrier is out of synchronization with one or more other carriers of the multi-carrier communication network, and code to delay the transmission for a duration less than one slot from the slot boundary when the UE cannot begin the transmission on the slot boundary because the contention-based shared carrier is out of synchronization.

In an additional aspect of the disclosure, a non-transitory computer-readable medium having program code recorded thereon. The program code further includes code to receive, at a UE code to schedule for transmission on a contention-based shared carrier of a multi-carrier communication network, code to determine a slot boundary on which the transmission is scheduled to begin, code to perform a full LBT procedure for the contention-based shared carrier before the slot boundary, code to determine the contention-based shared carrier is out of synchronization with one or more other carriers of the multi-carrier communication network, and code to refrain from performing an LBT procedure between the slot boundary and an expected transmission time, wherein the expected transmission time is less than a duration of one slot from the slot boundary.

In an additional aspect of the disclosure, a non-transitory computer-readable medium having program code recorded thereon. The program code further includes code to receive an uplink grant at a UE from a base station for transmission on a contention-based shared spectrum, wherein the uplink grant includes a 4-bit indicator identifying a resource allocation, wherein the 4-bit indicator identifies contiguous interlace allocations of the resource allocation and an interlace configuration of the resource allocation, and code to send, by the UE, the transmission according to the uplink grant.

In an additional aspect of the disclosure, a non-transitory computer-readable medium having program code recorded thereon. The program code further includes code to receive a common control signal from a base station including at least an uplink burst offset, an uplink burst duration, and partial subframe indicator, wherein the partial subframe indicator identifies a current subframe as an end partial subframe before start of an uplink burst, code to transmit uplink data during a partial uplink portion of the current subframe after the receiving, and code to transmit additional uplink data according to the common control signal.

In an additional aspect of the disclosure, an apparatus configured for wireless communication is disclosed. The apparatus includes at least one processor, and a memory coupled to the processor. The processor is configured to receive a resource allocation for a contiguous transmission over a set of subframes on a secondary carrier including contention-based shared spectrum, to initiate transmission on the secondary carrier, to pause transmission on the secondary carrier prior to completion of the contiguous transmission over the set of subframes of the resource allocation, to resume transmission of the contiguous transmission on the secondary carrier after the pausing in response to a successful full listen before talk (LBT) check, wherein the resuming reoccupies the secondary carrier without start of a new channel occupancy of the secondary carrier.

In an additional aspect of the disclosure, an apparatus configured for wireless communication is disclosed. The apparatus includes at least one processor, and a memory coupled to the processor. The processor is configured to determine, at a base station, data for transmission to one or UEs, wherein the base station is part of a multi-carrier transmission network with contention-based shared spectrum, to perform a LBT procedure at the base station prior to initiating transmission, wherein the LBT procedure is one of: a full LBT procedure, or a reduced LBT procedure, to signal a type indicator to the one or more UEs, wherein the type indicator identifies a type of the LBT procedure performed by the base station, and to transmit the data to the one or more UEs.

In an additional aspect of the disclosure, an apparatus configured for wireless communication is disclosed. The apparatus includes at least one processor, and a memory coupled to the processor. The processor is configured to receive an uplink grant at a UE from a base station in a multi-carrier transmission network with contention-based shared spectrum, to receive a LBT type indicator at the UE from the base station, wherein the LBT type indicator identifies a type of LBT procedure performed by the base station, to detect, by the UE, a transmission gap less than a predefined length on a contention-based shared carrier associated with the uplink grant, to detect failure of a first reduced LBT procedure at the UE for the contention-based shared carrier, to perform a second LBT procedure at the UE accordance with the LBT type indicator identifying a full LBT procedure performed by the base station, and to dismiss, by the UE, a transmission attempt associated with the uplink grant in response to the LBT type indicator identifying a reduced LBT procedure performed by the base station.

In an additional aspect of the disclosure, an apparatus configured for wireless communication is disclosed. The apparatus includes at least one processor, and a memory coupled to the processor. The processor is configured to receive, at a UE, to schedule for transmission up to a predetermined maximum transmission length on a contention-based shared carrier, to determine, by the UE, a gap in the scheduling, wherein the gap is greater than or equal to a predetermined minimum time, to perform a reduced LBT procedure in response to an end of the gap, and to resume transmission after the gap in response to the reduced LBT procedure being successful.

In an additional aspect of the disclosure, an apparatus configured for wireless communication is disclosed. The apparatus includes at least one processor, and a memory coupled to the processor. The processor is configured to receive, at a UE, to schedule for transmission on a contention-based shared carrier of a multi-carrier communication network, to determine a slot boundary on which the transmission is scheduled to begin, to perform a full LBT procedure for the contention-based shared carrier before the slot boundary, to determine the contention-based shared carrier is out of synchronization with one or more other carriers of the multi-carrier communication network, and to delay the transmission for a duration less than one slot from the slot boundary when the UE cannot begin the transmission on the slot boundary because the contention-based shared carrier is out of synchronization.

In an additional aspect of the disclosure, an apparatus configured for wireless communication is disclosed. The apparatus includes at least one processor, and a memory coupled to the processor. The processor is configured to receive, at a UE, to schedule for transmission on a contention-based shared carrier of a multi-carrier communication network, to determine a slot boundary on which the transmission is scheduled to begin, to perform a full LBT procedure for the contention-based shared carrier before the slot boundary, to determine the contention based shared carrier is out of synchronization with one or more other carriers of the multi-carrier communication network, and to refrain from performing an LBT procedure between the slot boundary and an expected transmission time, wherein the expected transmission time is less than a duration of one slot from the slot boundary.

In an additional aspect of the disclosure, an apparatus configured for wireless communication is disclosed. The apparatus includes at least one processor, and a memory coupled to the processor. The processor is configured to receive an uplink grant at a UE from a base station for transmission on a contention-based shared spectrum, wherein the uplink grant includes a 4-bit indicator identifying a resource allocation, wherein the 4-bit indicator identifies contiguous interlace allocations of the resource allocation and an interlace configuration of the resource allocation, and to send, by the UE, the transmission according to the uplink grant.

In an additional aspect of the disclosure, an apparatus configured for wireless communication is disclosed. The apparatus includes at least one processor, and a memory coupled to the processor. The processor is configured to receive a common control signal from a base station including at least an uplink burst offset, an uplink burst duration, and partial subframe indicator, wherein the partial subframe indicator identifies a current subframe as an end partial subframe before start of an uplink burst, to transmit uplink data during a partial uplink portion of the current subframe after the receiving, and to transmit additional uplink data according to the common control signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 9A-9E, are block diagrams illustrating communications over contention-based carriers between eNBs and UEs configured according to aspects of the present disclosure.

DETAILED DESCRIPTION

Figure 1:
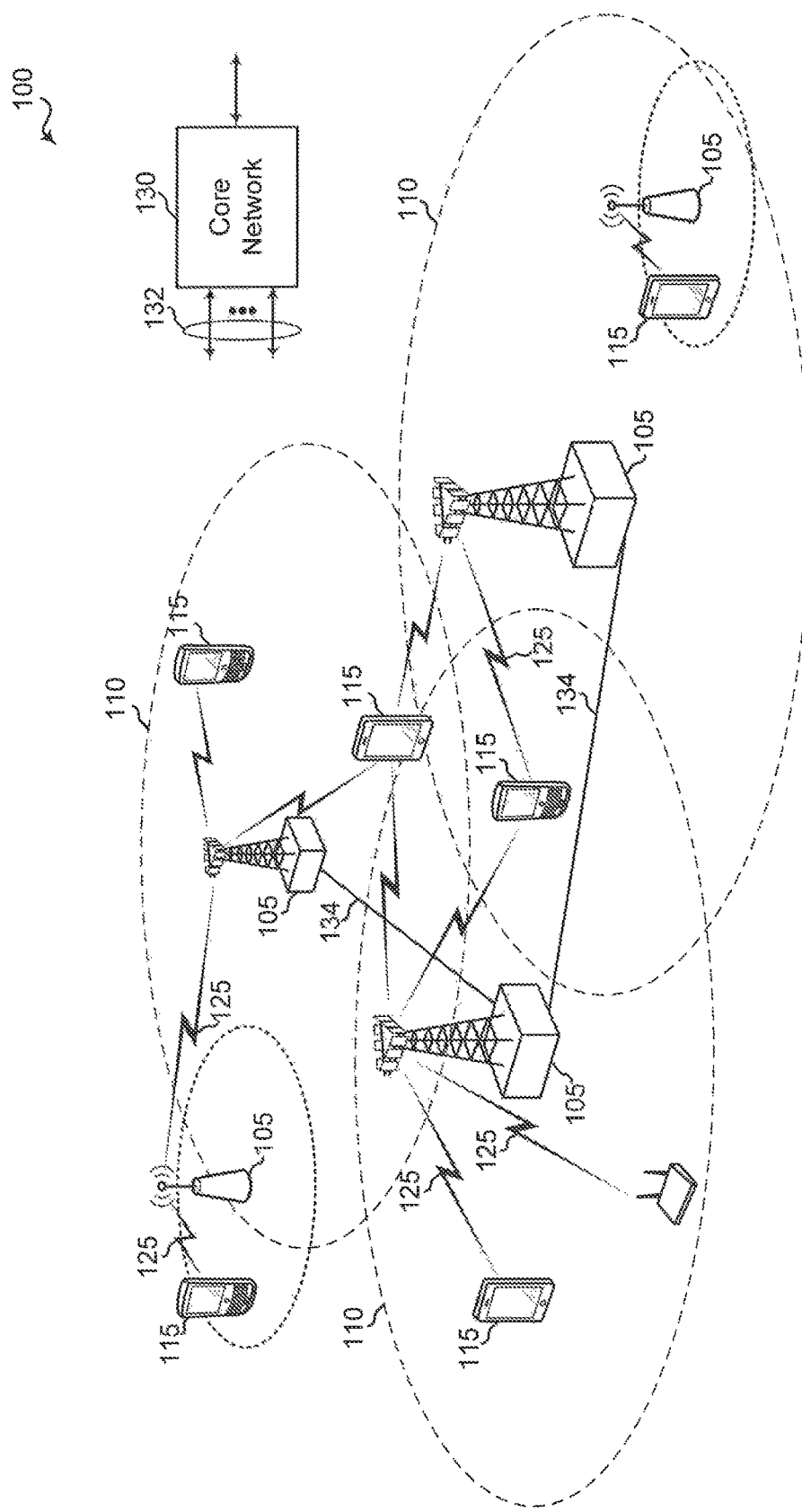
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A. Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
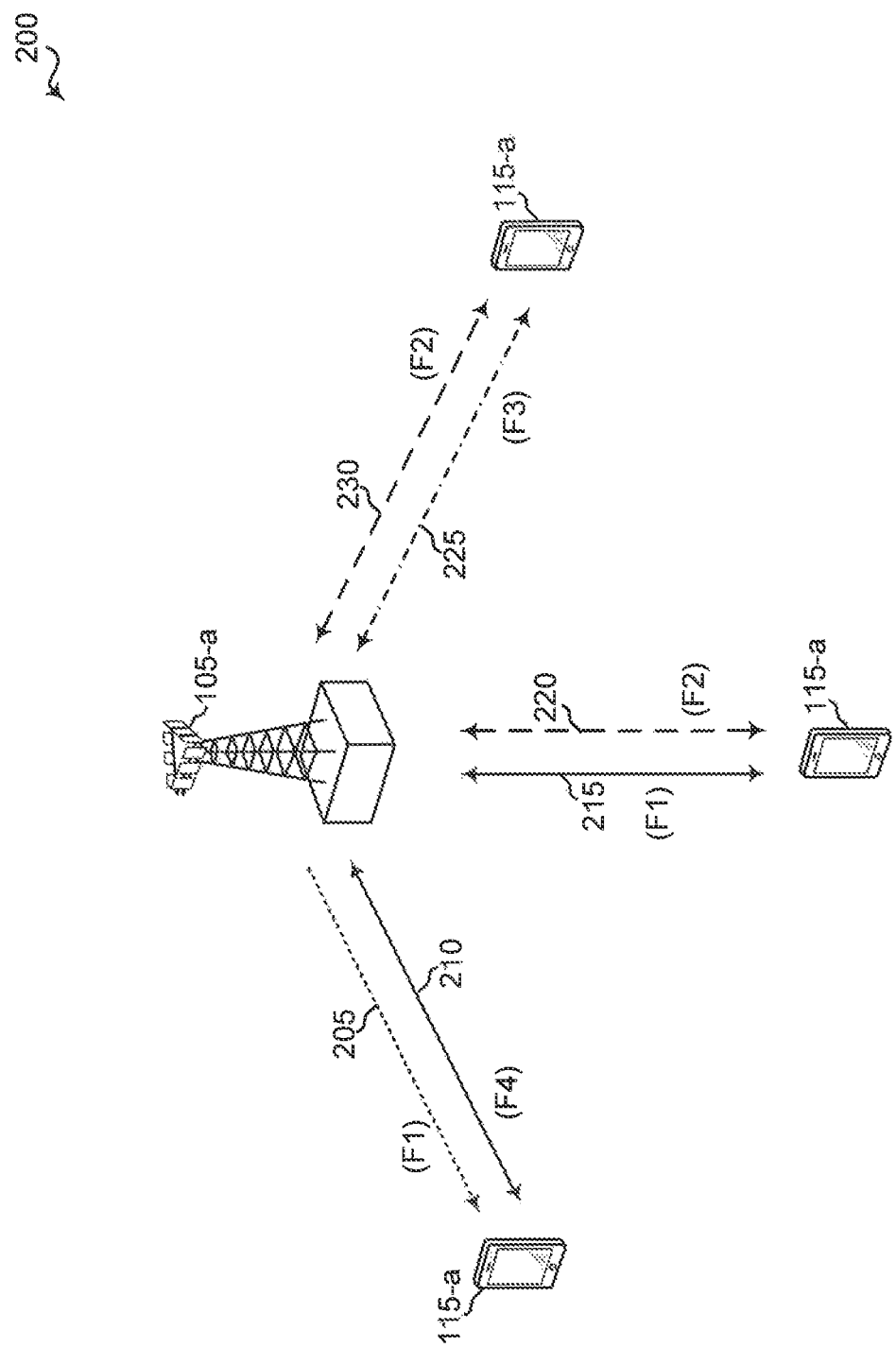
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode (e.g., LAA mode) in diagram 200, the base station 105-*a* may transmit communications signals to a UE 115-*a* using a downlink 205. The downlink 205 is associated with a frequency F1 in an unlicensed spectrum. The base station 105-*a* may transmit communications signals to the same UE 115-*a* using a bidirectional link 210 and may receive communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit communications signals to a UE 115-*a* using a bidirectional link 215 and may receive communications signals from the same UE 115-*a* using the bidirectional link 215. The bidirectional link 215 is associated with the frequency F1 in the unlicensed spectrum. The base station 105-*a* may also transmit communications signals to the same UE 115-*a* using a bidirectional link 220 and may receive communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit communications signals to a UE 115-*a* using a bidirectional link 225 and may receive communications signals from the same UE 115-*a* using the bidirectional link 225. The bidirectional link 225 is associated with the frequency F3 in an unlicensed spectrum. The base station 105-*a* may also transmit communications signals to the same UE 115-a using a bidirectional link 230 and may receive communications signals from the same LE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the LAA mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

Beyond LAA modes in which non-contention-based spectrum is aggregated with contention-based spectrum for downlink data transmissions, enhanced LAA (eLAA) is contemplated for improving upon LAA by including both downlink and uplink carrier aggregation of non-contention-based spectrum with contention-based spectrum, dual contention-based and non-contention-based connectivity across both small cells and traditional large cells, in addition to further reduction of signal complexity for more efficient channel coding and higher data rates.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
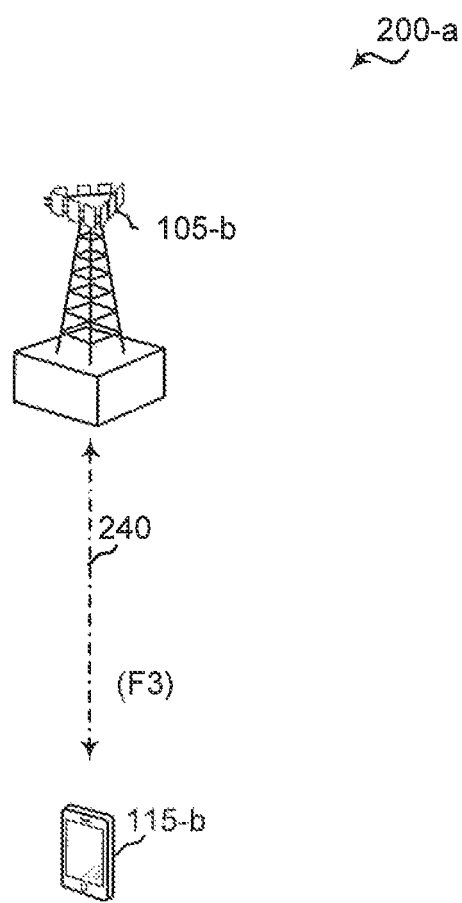
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A extended to contention-based shared spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit communications signals to the UE 115-b using a bidirectional link 240 and may receive communications signals from the UE 115-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105 or 105-a described with reference to FIG. 1, 2A, or 2B, or one of the UEs 115, 115-a, or 115-b described with reference to FIG. 1, 2A, or 2E, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
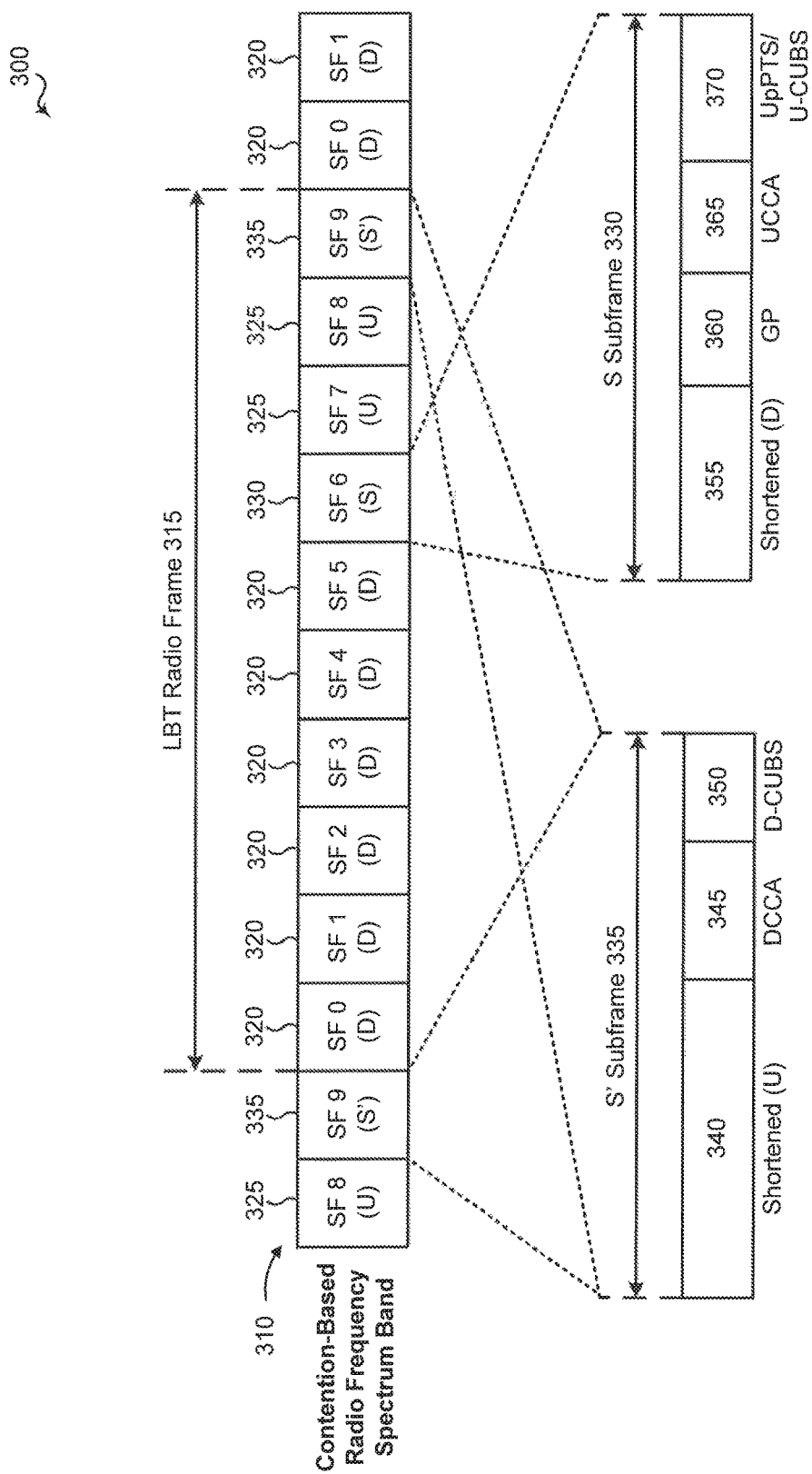
FIG. 3 is an illustration of an example of a wireless communication over an unlicensed radio frequency spectrum band, in accordance with various aspects of the present disclosure.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, or 105-a described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, Wifi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340, A second portion of the S' subframe 335 may be used for the downlink CCA procedure 345, A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-a, 215-b, or 215-c described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA (ECCA) procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
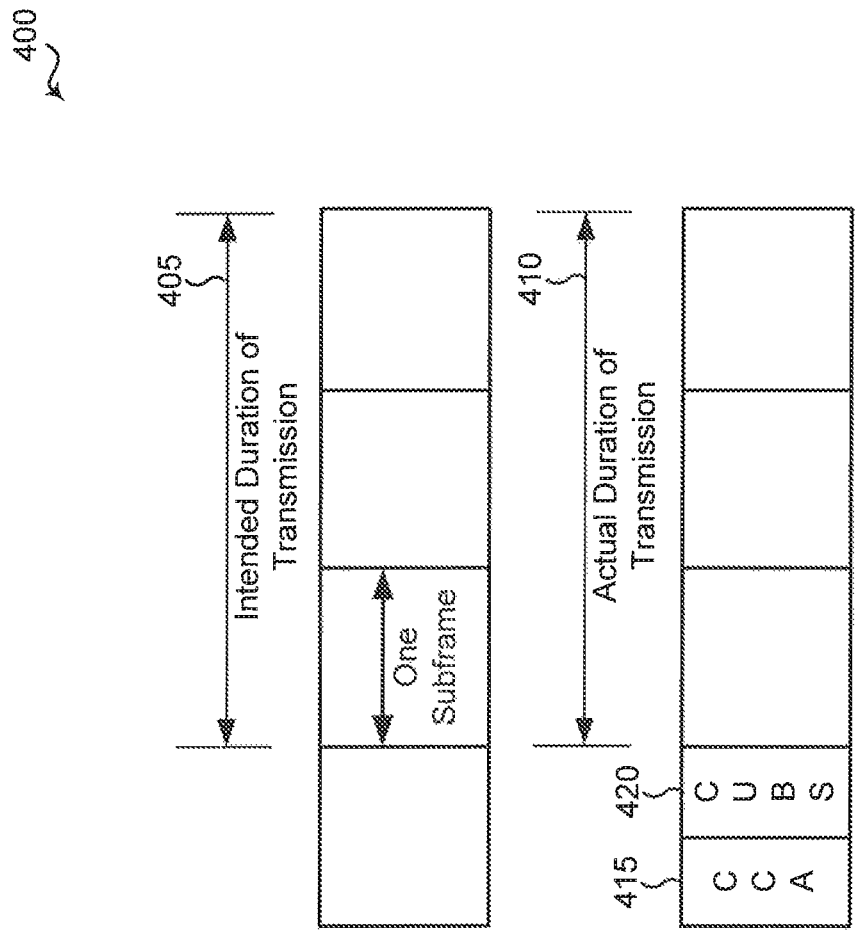
FIG. 4 is an illustration of an example of a CCA procedure performed by a transmitting apparatus when contending for access to a contention-based shared radio frequency spectrum band, in accordance with various aspects of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol. Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
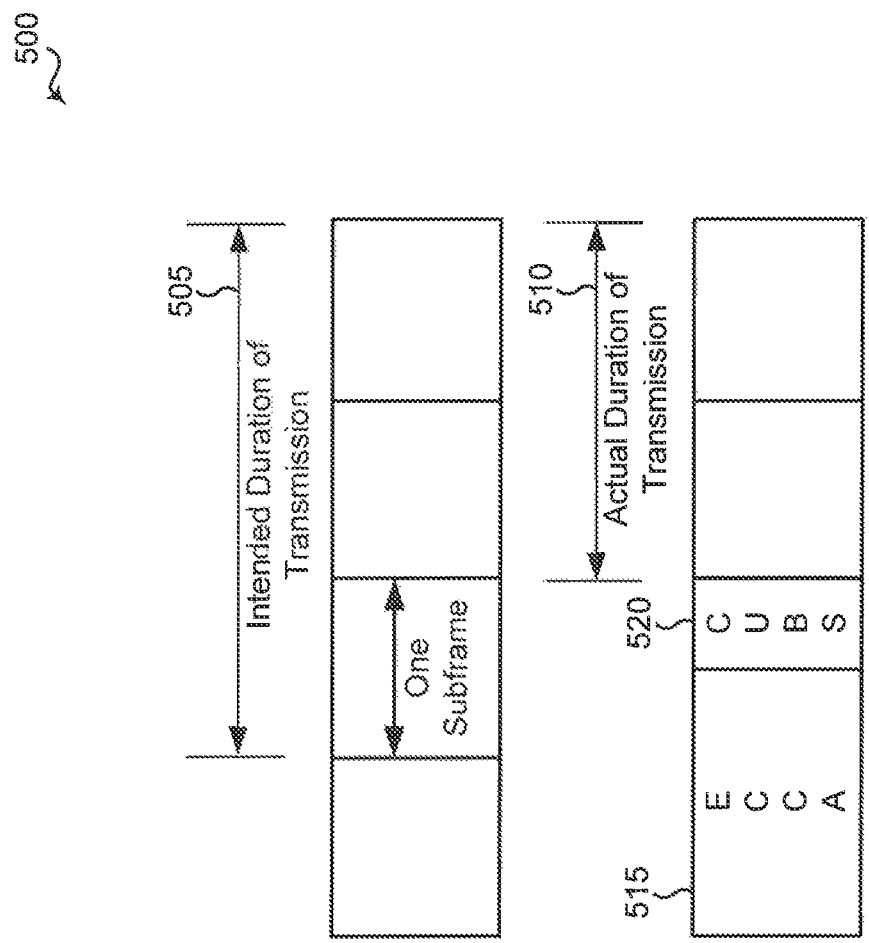
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes. When both the CCA procedure and ECCA procedure are performed, the combined procedures may, as a whole, be referred to as a category 4 (Cat 4) LBT procedure.

As indicated above, FIG. 5 is provided as an example. Other examples are possible and may differ from what was described in connection with FIG. 5.

Figure 6:
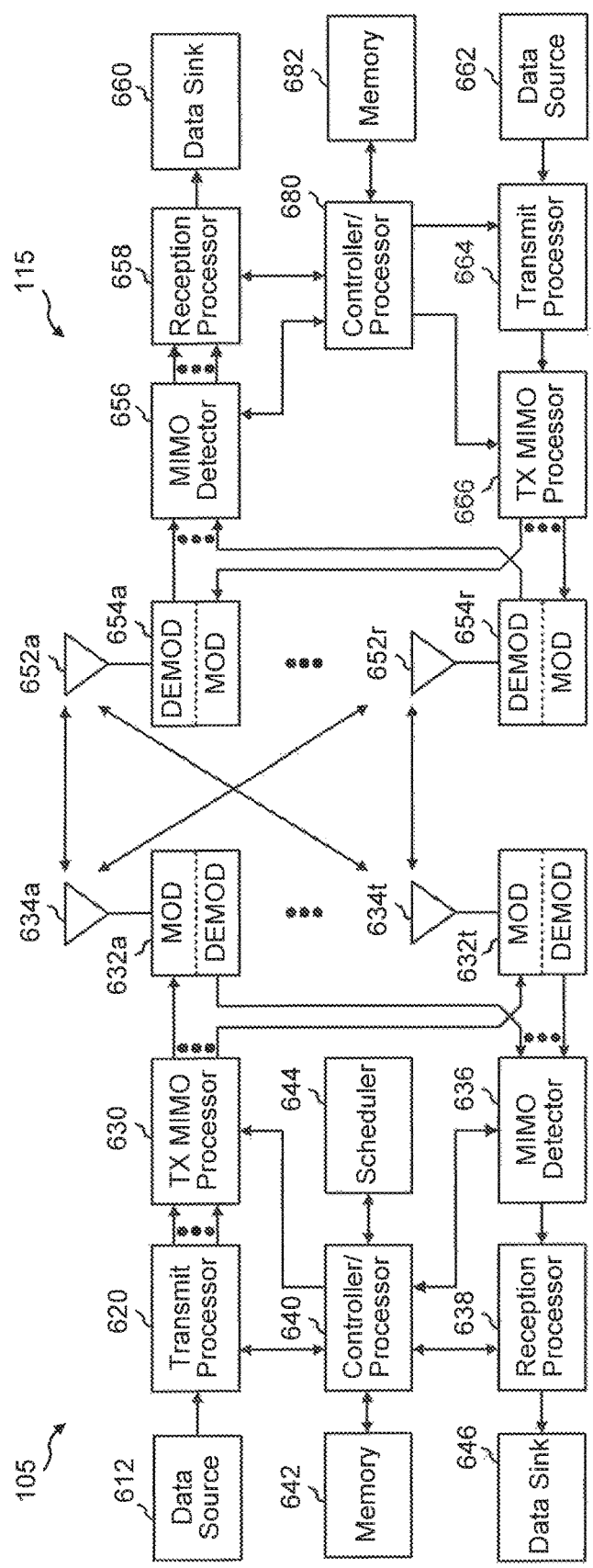
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652.a through 652r.

At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and modules at the eNB 105 may perform or direct the execution of various processes for the techniques described herein. The controllers/processor 680 and/or other processors and modules at the UE 115 may also perform or direct the execution of the functional blocks illustrated in FIGS. 8, 10A, 10B, and 12, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, etc., for particular carrier frequencies, or both. For example, in a CA scenario, the device may use a fixed number of antennas for one carrier. Conversely, the device may use a fixed number of antennas for when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

When a UE begins contiguous transmission spanning a set of subframes on a contention-based carrier of an LAA secondary cell and then suspends or pauses transmission prior to the last scheduled subframe in the transmission, the UE may resume transmission on the remaining subframes in the transmission immediately after performing a successful LBT procedure. If, during the paused transmission, the channel was observed to be continuously idle, the UE may restart transmissions on the channel after successfully performing an LBT with a duration of 25 microseconds (µs) (a reduced LBT procedure). Otherwise, if the channel was not observed to be continuously idle, then the UE may resume transmission on the LAA channel after successfully performing a Cat. 4 LBT procedure with LBT parameters according to the indicated LBT priority class in the uplink grant that scheduled the subframe in the transmission (a full LBT procedure).

According to the current standards for LAA mode networks, no two channel occupancies, whether initiated by the eNB or by UEs served by the eNB, can overlap in time. Moreover, the current LAA standards also provide that channel occupancy may be started with an uplink transmission after the UE performs a successful Cat. 4 LBT procedure. However, these two agreed standards may sometimes be incompatible, as the UE is allowed to perform a Cat. 4 LBT procedure to access the medium after a dropped transmission, in which case the channel occupancy from the UE and the eNB overlap with each other. In a first aspect of the present disclosure, if the UE starts a contiguous transmission spanning a set of subframes on an LAA SCell, and the UE, thereafter, suspends transmission prior to the last scheduled subframe in the transmission, and if the UE performs Cat. 4 LBT to initiate a resume a transmission, then this Cat. 4 LBT does not start a new channel occupancy. Accordingly, once the scheduled transmission has begun but is paused before finishing, the UE may re-occupy the LAA channel after a successful Cat. 4 LBT procedure.

Figure 7:
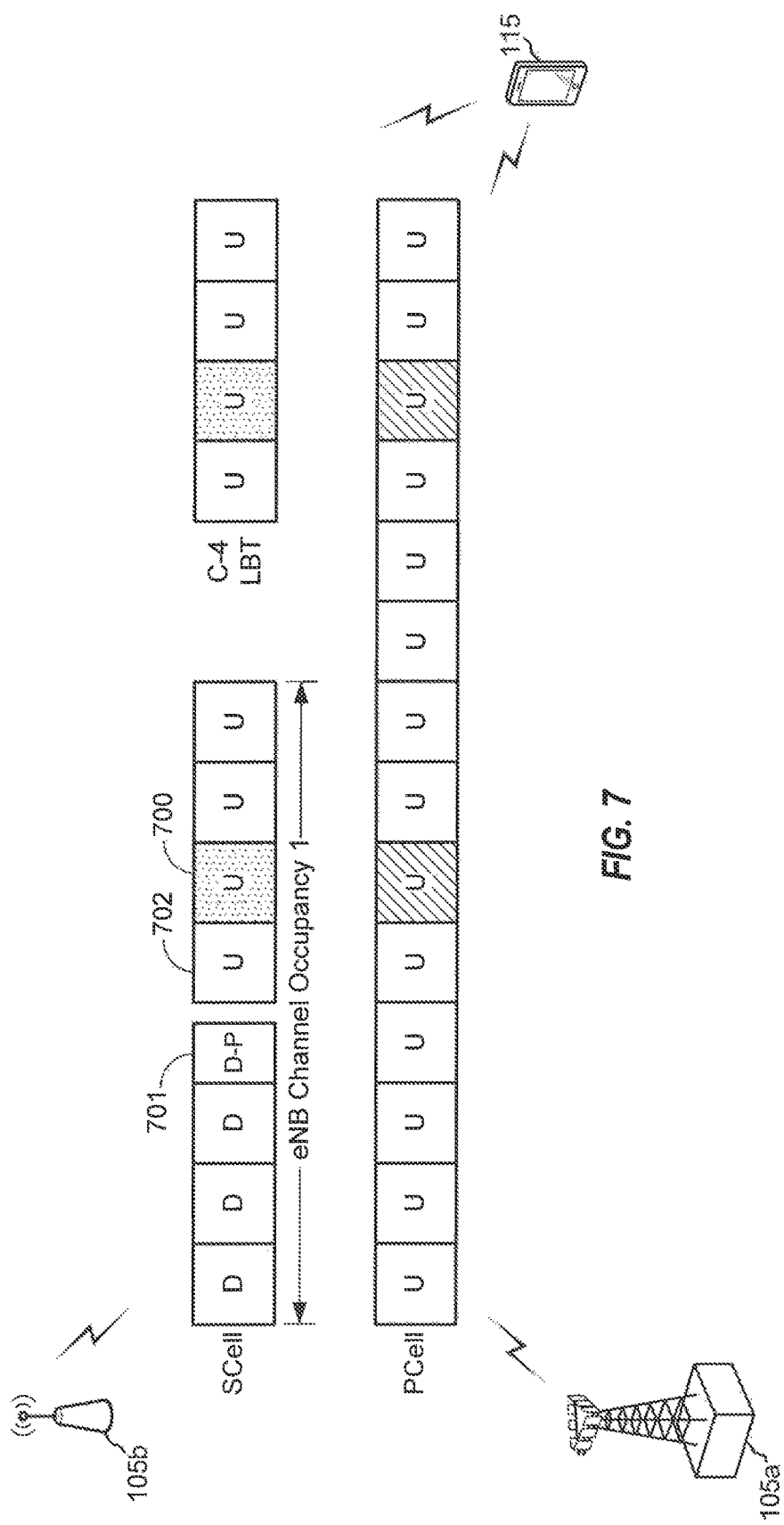
FIG. 7 is a block diagram illustrating a UE configured according to one aspect of the present disclosure.
Figure 11:
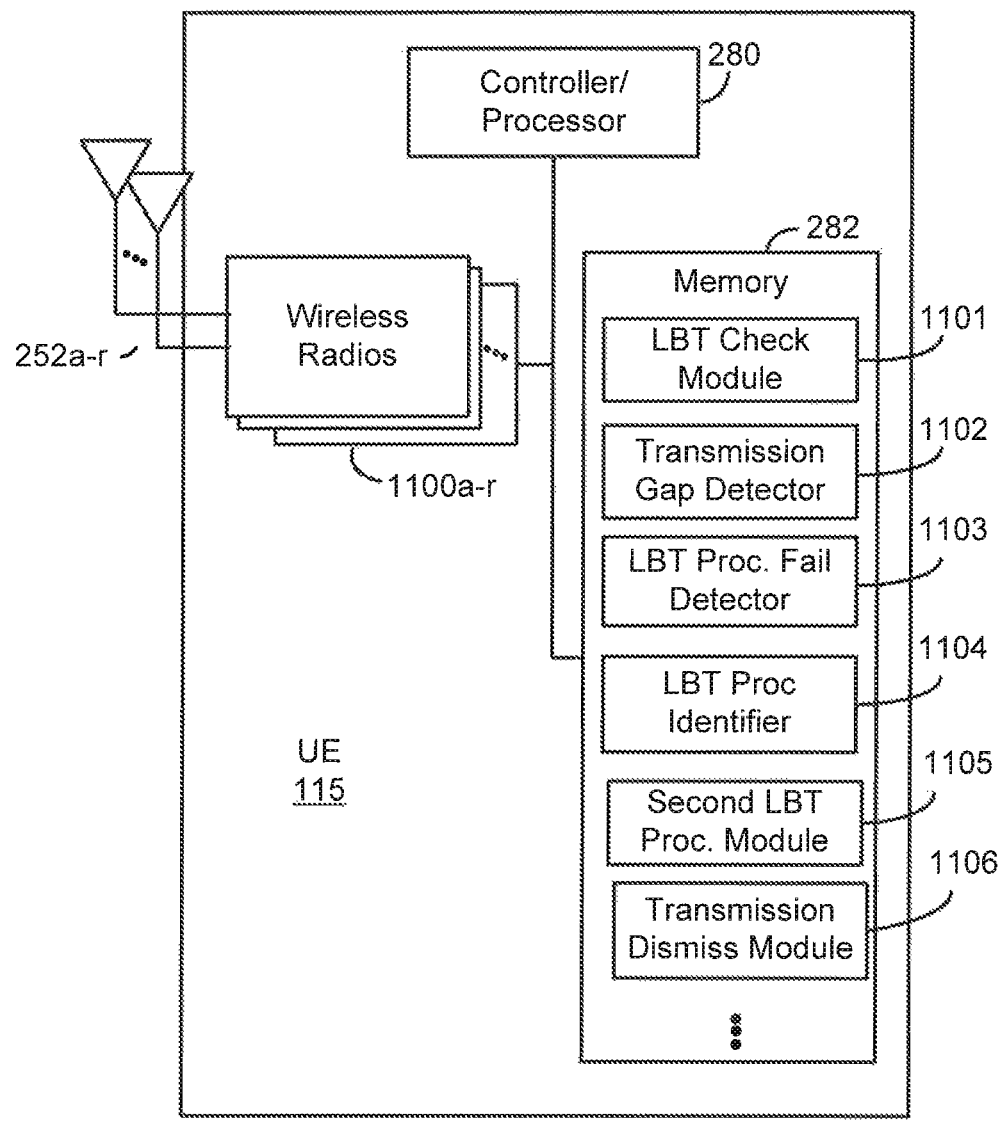
FIG. 11 is a block diagram illustrating an example UE configured according to aspects of the present disclosure.

FIG. 7 is a block diagram illustrating a UE 115 configured according to one aspect of the present disclosure. The example blocks will also be described with respect to UE 115, as illustrated in FIG. 11, FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100*a-r* and antennas 252*a-r*. Wireless radios 1100*a-r* includes various components and hardware, as illustrated in FIG. 2 for base station 105, including modulator/demodulators 254*a-r*, MIMO detector 256, receive processor 258, transmit processor 264, and TX MIMO processor 266.

UE 115 operates in an LAA environment in aggregated communication over a non-contention-based primary carrier (PCell) operated by eNB 105*a* and a contention-based secondary carrier (SCell) operated by eNB 105*b*. UE 115 receives resource allocation for contiguous transmission over a set of subframes. For example, UE 115 receives the resource allocation for a contiguous transmission over the set of subframes on the secondary carrier including contention-based shared spectrum via antennas 252*a-r* and wireless radios 1100*a-r*, under control of controller/processor 280. While communicating using the LAA carrier aggregation of non-contention-based and contention-based carriers, e.g., via wireless radios 1100*a-r* and antennas 252*a-r*, UE 115 may be operating in a power-limited mode. For example, while allocated for uplink transmission in the contiguous uplink subframes of the SCell, transmission by UE 115 in the PCell causes the transmission in subframe 700 to be dropped prior to completion of the allocated transmissions. Because the channel may detect activity in the SCell caused by the communications over the PCell, UE 115 would perform a Cat. 4 LBT to resume transmission and reoccupy the contention-based carrier of the SCell. For example, UE 115, under control of controller/processor 280, may activate LBT check module 1101, stored in memory 282. The execution environment of LBT check module 1101 allows UE 115 to form a Cat. 4 LBT. This resumption of transmission on the SCell, e.g., via antennas 252*a-r* and wireless radios 1100*a-r*, would not be considered a new channel occupancy, thus, preserving the agreed rules of the current LAA standards.

In a multi-carrier system, various types of multi-carrier LBT procedures may be available for securing transmission among multiple aggregated contention-based carriers. For example, one type of multi-carrier LBT procedure allows an eNB to share channel access based on a successful full LBT procedure (e.g., a Cat. 4 LBT) for a first contention-based secondary carrier with other UEs in a given maximum channel occupancy time (MCOT) by performing a reduced LBT procedure (e.g., a 25 μs LBT) for each of the other contention-based carriers. The channel occupancy of the eNB secured by the successful full LBT procedure may be shared when the uplink transmissions follow downlink transmissions or any uplink transmissions from other UEs of the previous subframes on the same carrier with a gap of no more than 25 μs and after performing a successful 25 μs uplink LBT within that gap. However, a UE may not know what type of LBT the base station has performed. Accordingly, another aspect of the present disclosure provides for an eNB to signal the type of LBT procedure performed.

In a first aspect, an eNB may dynamically signal a type indicator that identifies the type of LBT procedure performed by eNB. The type indicator may either identify the type of LBT procedure performed or may indicate whether or not a full LBT procedure (e.g., Cat. 4 LBT) has been performed by the eNB. This dynamic signaling may occur via a single bit in a common PDCCH (CPDCCH), which contains the signaling information for each carrier and is transmitted in each carrier separately. Alternatively, the type indicator may be dynamically signaled in the uplink grant.

In a second aspect of eNB LBT type signaling, the type indicator may be semi-statically signaled via RRC signaling. For example, the RRC signaling may indicate what the UE can assume about the eNB LBT on a particular carrier.

Using the information regarding the type of LBT procedure performed by an eNB in a multi-carrier system, the UE may determine when it may attempt to occupy the channel for uplink based on the gap length and successful completion of the reduced LBT procedure. For example, when the type indicator identifies that an eNB on a contention-based carrier performed a 25 μs LBT procedure, the UE would not continue to attempt transmission if it does not successfully complete the LBT procedure in the very first scheduled subframe for it.

Figure 8A:
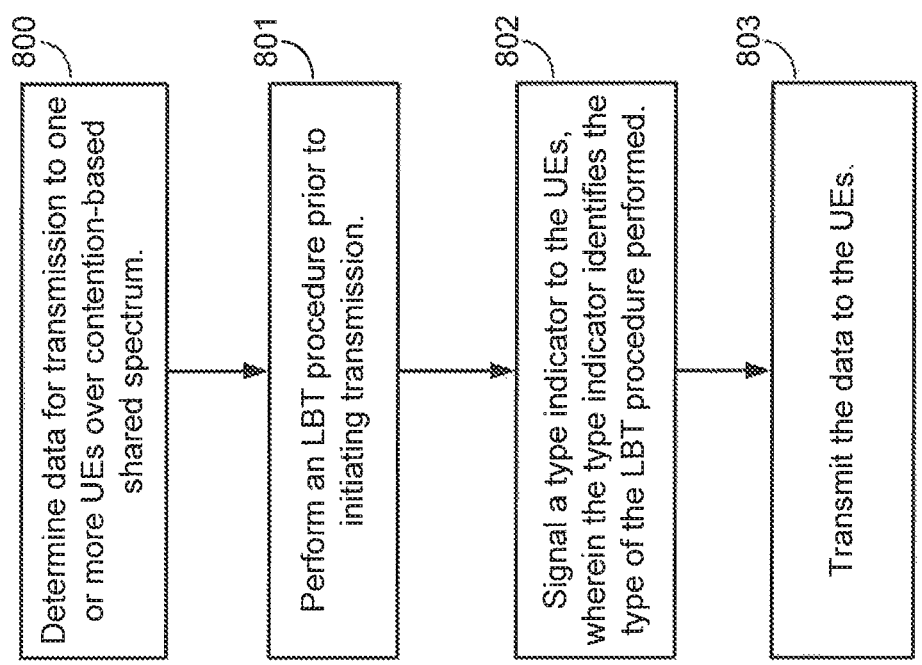
FIGS. 8A and 8B are block diagrams illustrating example blocks executed to implement one aspect of the present disclosure.

FIG. 8A is a block diagram illustrating example blocks executed to implement one aspect of the present disclosure. At block 800, a base station determines data for transmission to one or more UEs, wherein the base station is part of a multi-carrier transmission network with contention-based shared spectrum. As the data arrives or is retrieved at the base station addressed to one or more of the served UEs, the base station will prepare for transmission.

At block 801, the base station performs an LBT procedure prior to initiating transmission, wherein the LBT procedure is one of: a full LBT procedure, or a reduced LBT procedure. Prior to transmission, the base station first attempts to secure access to the contention-based secondary carriers (SCell) if transmission are to occur over such carrier. The base station will perform LBT, either as a full LBT or reduced LBT, to reserve access to the SCell.

At block 802, the base station signals a type indicator to the UEs, wherein the type indicator identifies a type of the LBT procedure performed by the base station. In order to provide the UE with appropriate information according to the described aspect, the base station will signal a type indicator to the UE identifying which type of LBT procedure has been performed to reserve access to the channel by the base station.

At block 803, the base station then transmits the data to the UEs. Accordingly, after performing the LBT procedure, the base station will signal the UE the type of LBT procedure performed.

Figure 8B:
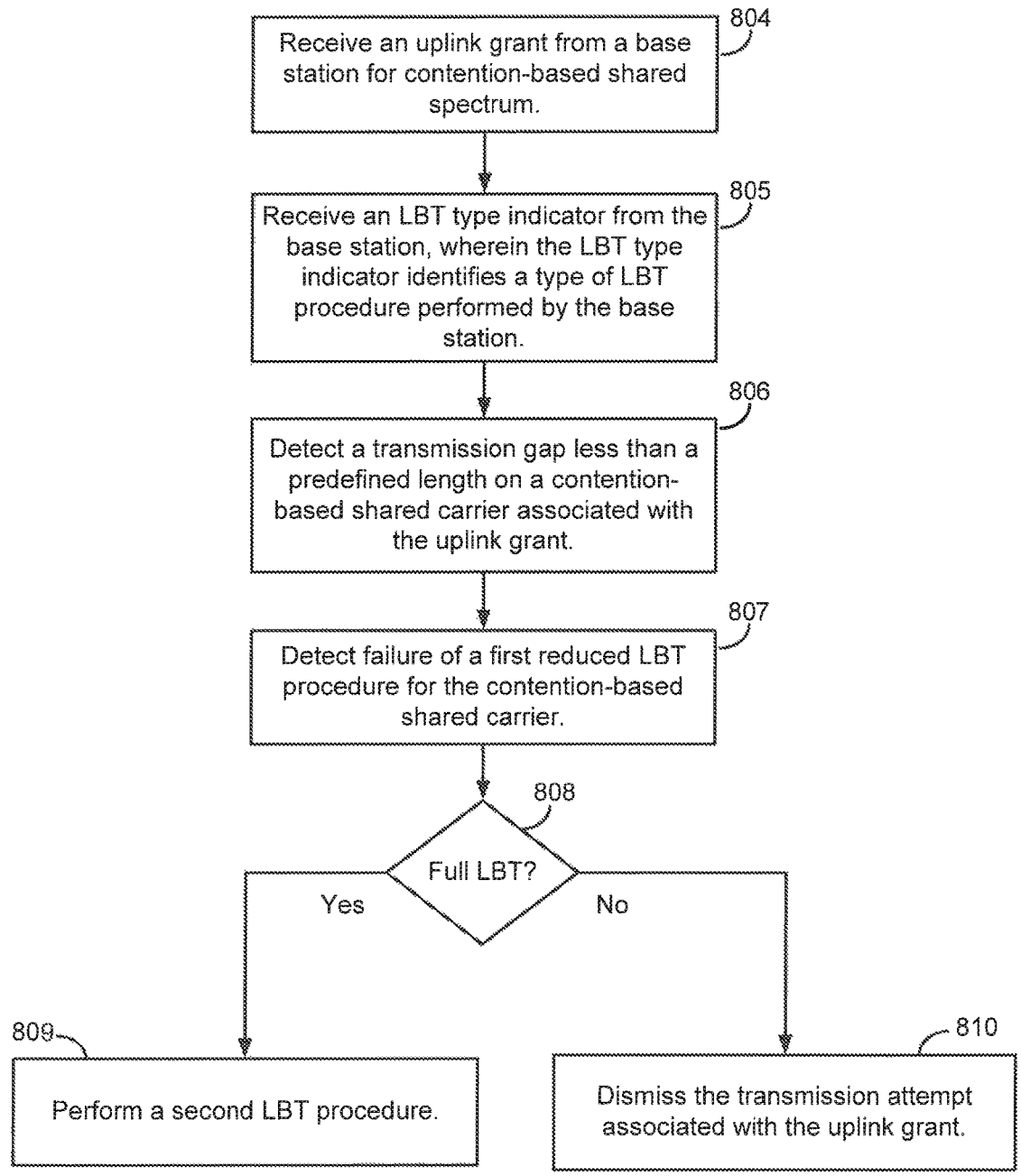

FIG. 8B is a block diagram illustrating example blocks executed to implement one aspect of the present disclosure. The example blocks will also be described with respect to UE 115, as illustrated in FIG. 11. At block 804, a UE receives an uplink grant from a base station in a multi-carrier transmission network with contention-based shared spectrum. For example, UE 115 receives the uplink grant from base station 105 via antennas 252a-r and wireless radios 1100a-r, under control of controller/processor 280.

At block 805, the UE receives an LBT type indicator from the base station, wherein the LBT type indicator identifies a type of LBT procedure performed by the base station. For example, UE 115 receives the LBT type indicator from base station 105 via antennas 252a-r and wireless radios 1100a-r, under control of controller/processor 280.

At block 806, the UE detects a transmission gap less than a predefined length on a contention-based shared carrier associated with the uplink grant, UE 115, under control of controller/processor 280, may activate transmission gap detector 1102, stored in memory 282. The execution environment of transmission gap detector 1102 allows UE 115 to detect a transmission gap less than a predefined length on a contention-based shared carrier associated with the uplink grant.

At block 807, the UE further detects a failure of the first reduced LBT procedure at the UE for the contention-based shared carrier. UE 115, under control of controller/processor 280, may activate LBT procedure failure detector 1103, stored in memory 282. The execution environment of LBT procedure failure detector 1103 allows UE 115 to detect the failure of the first reduced LBT procedure at the UE for the contention-based shared carrier.

At block 808, a determination is made by the UE whether the LBT type indicator identifies whether or not the base station performed a full LBT procedure, UE 115, under control of controller/processor 280, may activate LBT procedure identifier 1104, stored in memory 282. The execution environment of LBT procedure identifier 1104 allows UE 115 to determine whether the LBT type indicator identifies whether or not the base station performed a full LBT procedure.

If so, then, at block 809, the UE performs a second LBT procedure to attempt to secure the channel. For example, UE 115, under control of controller/processor 280, may activate second LBT procedure module 1105, stored in memory 282. The execution environment of second LBT procedure module 1105 allows UE 115 to perform the second LBT procedure to attempt to secure the channel.

Otherwise, if the LBT type indicator indicates that the base station did not perform a full LBT procedure, then, at block 810, the UE dismisses the transmission attempt associated with the uplink grant. For example, UE 115, under control of controller/processor 280, may activate transmission dismiss module 1106, stored in memory 282. The execution environment of transmission dismiss module 1106 allows UE 115 to dismiss the transmission attempt associated with the uplink grant.

FIGS. 9A-9E are block diagrams illustrating communications over contention-based carriers between eNBs 105b and 105c, UE 115a, or UEs 115a and 115b, each of which are configured according to aspects of the present disclosure. At FIG. 9A, eNB 115b, operating SCell 1 performs a Cat. 4 LBT procedure to secure the contention-based carrier of SCell 1. eNB 115b may signal the type indicator either dynamically (e.g., via CPDCCH, uplink grant, etc.), or semi-statically (e.g., via RRC signaling) to UE 115a. The type indicator identifies to UE 115a that eNB 115b performed a Cat. 4 LBT procedure. Similarly, eNB 105, operating contention-based SCell 2, secures the channel by successfully performing a reduced LBT procedure (e.g., a 25 μs LBT). Over the maximum channel occupancy time (MCOT), UE 115a may perform aggregated uplink transmissions for eLAA using aggregated SCell1 and SCell 2, after the downlink transmissions of eNBs 105b and 105c. At 900 a gap of no more than 25 μs occurs. Based on the determination of the gap length and the type indicator for the LBT procedure used by eNBs 105b and 105c, UE 115a performs a 25 μs LBT procedure at 901 in order to occupy and send uplink transmissions on SCell 1 and SCell 2.

Figure 9A:
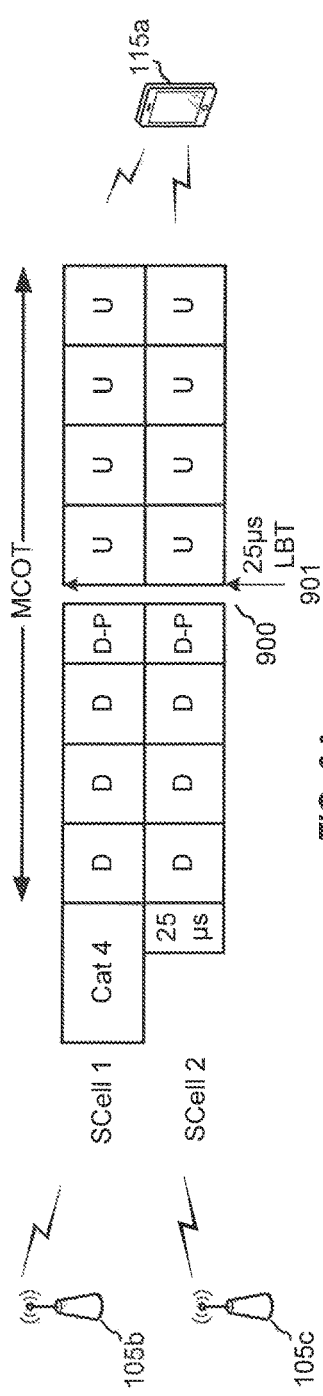
Figure 9B:
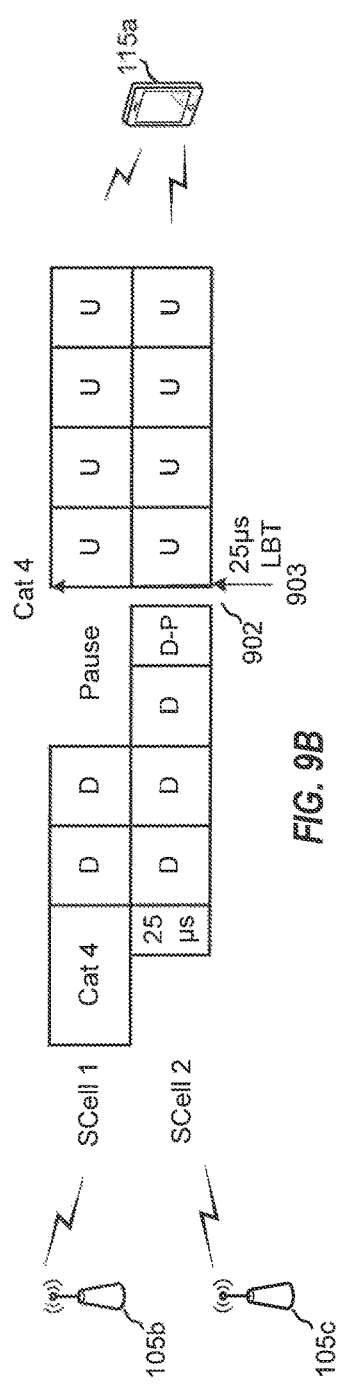

At FIG. 9B, UE 115a determines that the gap at 902 for SCell 1 is more than 25 μs, while the gap at 902 for SCell 2 is no more than 25 μs. Based on the type indicator identifying that eNB 105b performed a Cat. 4 LBT procedure for SCell 1, UE 115a may occupy and send uplink transmissions on SCell 1 after successfully completing a Cat. 4 LBT procedure at 903. As in FIG. 9A, because the gap at 902 for SCell 2 is no more than 25 μs, UE 115a may occupy and transmit on SCell 2 after successfully performing a reduced LBT procedure at 903.

Figure 9C:
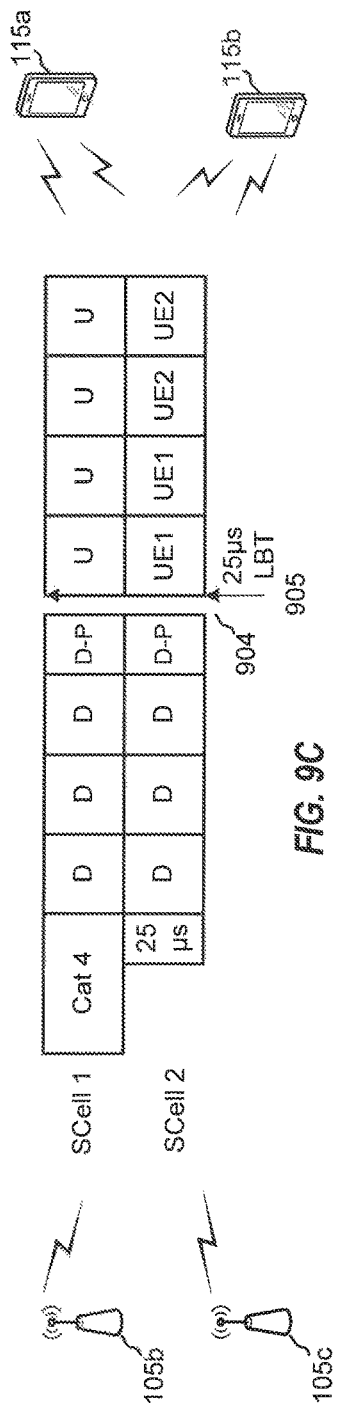

At FIG. 9C, eNB 105c may share its channel occupancy after the 25 μs LBT procedure securing SCell 2 with both UEs 105a and 105b (UE1 & UE2). Thus, after determining the gap at 904 is no more than 25 μs and with the type indicator identifying that eNB 105c performed a reduced LBT procedure, UEs 105a and 105b may send uplink transmissions on SCell 2. Similarly, uplink transmission may be sent on SCell 1 after a 25 μs LBT procedure based on the gap at 904 being no more than 25 μs and indication that eNB 105b performed a Cat. 4 LBT procedure.

At FIG. 9D, UE 115a determines that the pause at 906 is greater than 25 μs. While UE 115a may secure and transmit uplink data on SCell 1 after performing a Cat. 4 LBT procedure, knowing that eNB 105b performed a Cat. 4 LBT procedure to secure SCell 1. However, because eNB 105c performed a reduced LIST procedure to secure SCell 2, the gap at 906 is determined to be outside of the parameters for UE 115a to secure uplink transmissions on SCell 2.

At FIG. 9E, UE 115a may secure SCell 1 for uplink transmissions after the gap at 907 by performing a reduced LBT procedure at 908 with the knowledge that eNB 105b secured SCell 1 using a Cat. 4 LBT procedure. For SCell2, knowing that eNB 105c secured SCell 2 via a 25 μs LBT procedure and that the gap at 907 is no more than 25 μs, UE 115a attempts to secure SCell 2 by performing a 25 μs LBT procedure at 908. However, the 25 μs LBT procedure attempted by UE 115a fails. On failure of the 25 μs LBT procedure for this first schedule time period, UE 115a determines not to make any further attempts to pass the LBT procedure because of 25 μs LBT procedure used by eNB 105c to secure SCell 2.

UE Cat 4 LBT may include maximum and minimum codewords along with different maximum channel occupancy time (MCOT). The following Table 1 identifies the parameters associated with each LBT priority class.

TABLE 1

| LBT Priority Class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |

TABLE 1-continued

| LBT Priority Class | n | CWmin | CWmax | MCOT | Set of CW sizes |
|---|---|---|---|---|---|
| 3 | 3 | 15 | 1023 | 6 ms (see Note 1) or 10 ms (see Note 2)' | {15, 31, 63, 127, 255, 511, 1023} |
| 4 | 7 | 15 | 1023 | 6 ms (see Note 1) or 10 ms (see Note 2) | {15, 31, 63, 128,. 255, 511, 1023} |

NOTE 1:
The MCOT of 6 ms may be increased to 8 ms by inserting one or more gaps. The minimum duration of such a gap or pause should be 100 μs. The maximum duration (Channel Occupancy) before including any such gap may be 6 ms. The gap duration is not included in the channel occupancy time.
NOTE 2:
If the absence of any other technology sharing the carrier can be guaranteed on a long term basis (e.g., by level of regulation), the MCOT for LET priority classes 3 and 4 is 10 ms, otherwise, the MCOT for LET priority classes 3 and 4 is 6 ms, as identified in Note 1.

The gap or pause identified in Note 1 may be achieved in multiple ways: (1) SRS blanking in symbol 13 of subframe 'n−1' and blanking of symbol 0 in subframe 'n'; (2) subframe 'n−1' and subframe 'n+1' can be scheduled uplink subframes with unscheduled subframe acting as a gap. The method in which a UE recaptures the medium after such a gap or pause has not currently been defined in the standards. One option for a UE to recapture the medium may be to perform a 25 μs LBT procedure. It may be up to the UE to determine that all the gap and recapture attempt are part of a single transmission opportunity. Thus, once this is determined by the UE, it may resume transmissions after a successful 25 μs LBT (thereby overriding the eNB LBT indication in the grant).

In one aspect of the present disclosure, a UE may first determine the eNB has scheduled the UE contiguously for more than 6 ms and up to 8 ms. The UE determines that there is a gap or pause in scheduling by determining whether there is a gap of 1 subframe or of one or two symbols (e.g., PUSCH ends in symbol 12 or PUSCH starts after symbol 0 etc) Note that this gap or pause need not be located after 6 ms. Upon determining such a gap or pause, the UE may switch to performing a 25 μs LBT procedure to occupy the medium after the pause even after eNB indicates Cat. 4 LBT in the grant. The eNB indicates Cat. 4 LBT because, if the UE did not access the channel in the previous subframes, it would use a Cat. 4 LBT procedure to attempt to secure the channel.

In multi carrier LBT, the eNB/UE may be out of synchronization, such that the nodes may operate to synchronize transmissions in some manner when performing multi-carrier LBT. In a first alternative aspect, a self-deferral may be used in which the node completes the Cat. 4 LBT procedure, waits for a particular time (e.g., the between the LBT procedure and the scheduled transmit time), and then transmits if the medium remains idle for a defer period right before transmission. In a second alternative aspects, another self-deferral technique may be used in which the node does not count down and, instead, delays the completion of Cat. 4 LBT procedure until it reaches the transmission boundary. Both such options have been agreed to in 3GPP for eNB and UE operations in multi-carrier eLAA.

In the second alternative aspect, however, the device may not be able to count down to zero at the same time on all carriers if the slot boundary is not synchronized across all carriers. This may be due to different interferences seen on different carriers. In such an unsynchronized system, a question arises as to how the UE should complete multi-carrier full LBT procedures given that the slots may not be synchronized across carriers, while the UE is still scheduled to transmit on the slot boundary.

Figure 10A:
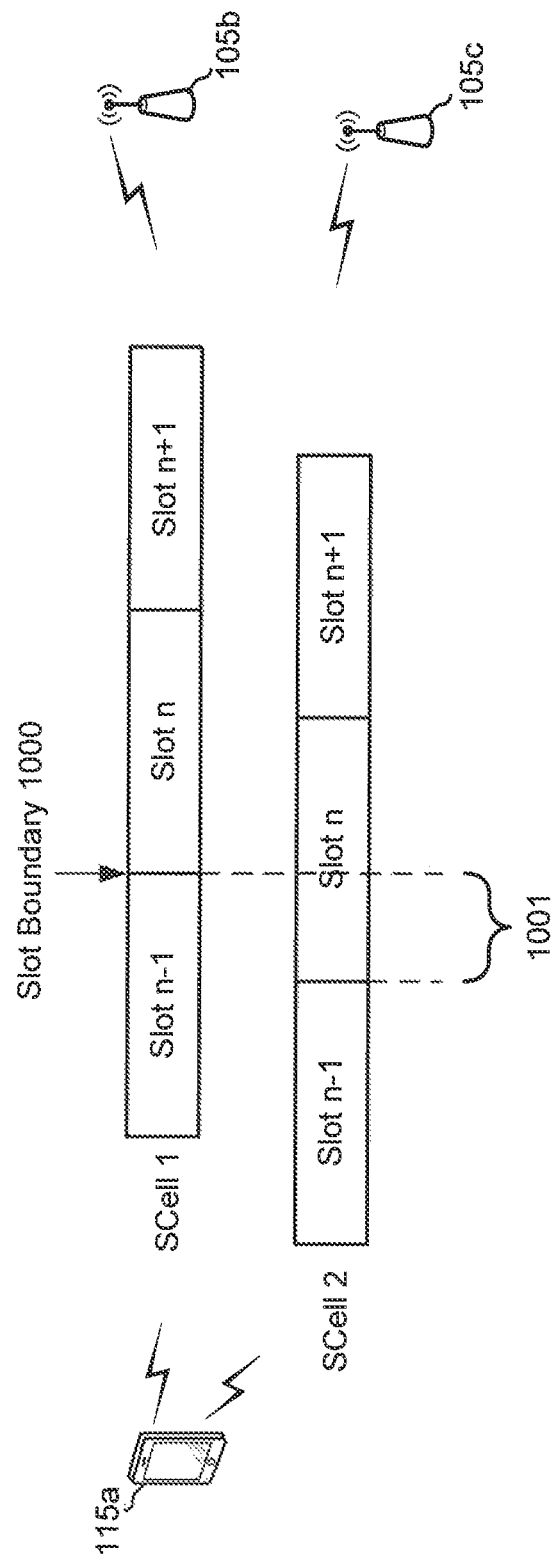
FIGS. 10A and 10B are block diagrams illustrating a UE configured according to aspects of the present disclosure.

FIG. 10A is a block diagram illustrating a UE 115a configured according to one aspect of the present disclosure. The contention-based carriers, SCell 1 and SCell 2, operated by eNB 105b and 105c in communication with UE 115a are out-of-synchronization. In the illustrated aspect, for scheduled transmissions on SCell 2, UE 115a is configured to delay transmission when the duration is less than the duration of a slot. As illustrated, delay 1001, between the beginning of slot n on SCell 2 and the slot boundary 1000 identified in SCell 1 is less than a full slot. Therefore, UE 115a would delay transmissions on SCell 2 until after delay 1001. By delaying transmissions, UE 115a would prevent a failure to secure the medium in SCell 1 if a reduced LBT procedure was performed just prior to slot boundary 1000.

Figure 10B:
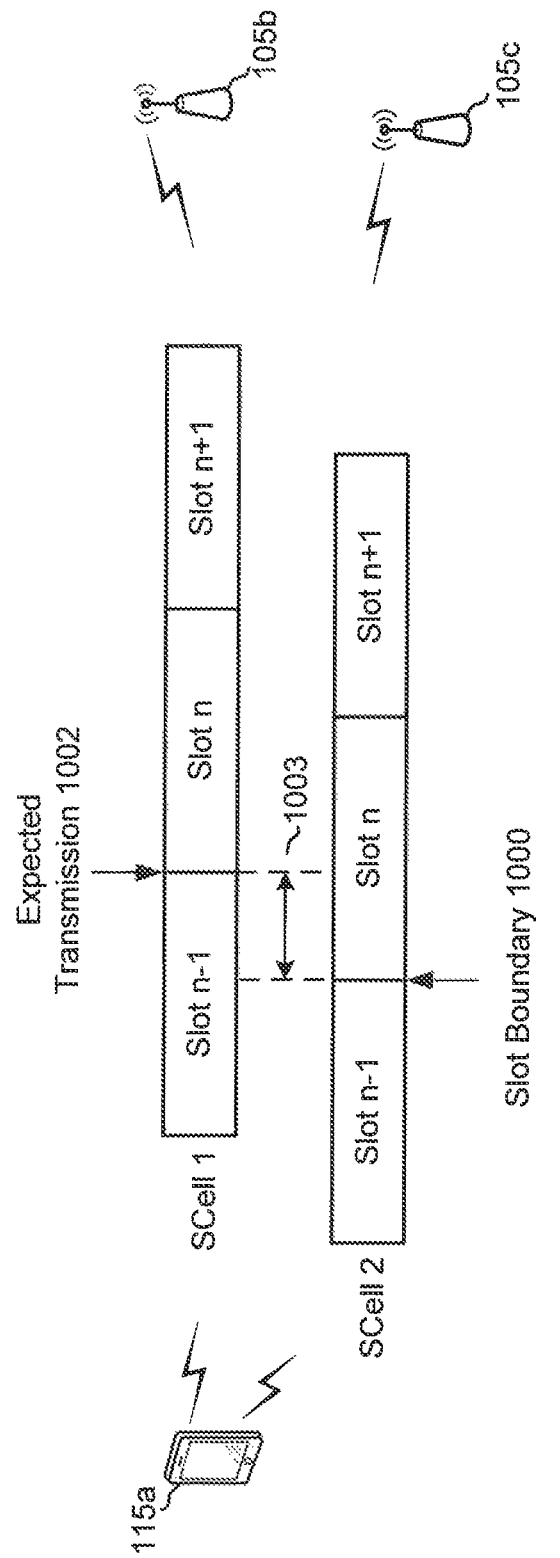

FIG. 10B is a block diagram illustrating UE 115a configured according to one aspect of the present disclosure. In an alternative aspect, with SCell 1 and SCell 2 being out of synchronization, the expected transmission time 1002 on SCell 1 is after slot boundary 1000 identified on SCell 2. If UE 115a were to perform any kind of LBT procedure of SCell 1 prior to expected transmission time 1002, it may fail because of the transmissions on SCell 2 to eNB 105c beginning at slot boundary 1000. The alternative aspect allows UE 115a to refrain from performing any type of LBT or sensing the medium when time 1003 between slot boundary 1000 and expected transmission time 1002 is less than the duration of a slot, as illustrated.

Various additional aspects of the present disclosure provide for PUSCH resource allocation for eLAA. Resource allocation for 5 MHz/10 MHz eLAA is not defined in current 3GPP standards. In a first proposal, for 5 MHz and 10 MHz eLAA, 4 bits may be used to indicate the resource allocation. The 4 bits correspond to a total of 16 code points allowed for determining the contiguous interlaces and the configurations of the interlaces. 15 of the 16 code points may indicate all the contiguous interlace allocations, while the remaining 1 additional code point indicates configuration of the interlace (e.g., 0+2 or 0+3). For example, with reference to FIG. 7, eNB 105a may transmit an uplink grant to UE 115 that includes eLAA PUSCH resource allocation. The resource allocation would include the 4-bit indicator in which 3 of the bits are used to represent 15 code points identifying all of the contiguous interlace allocations, while the remaining bit of the 4-bit indicator identifies the configuration of the interlace. Thus, as UE 115 transmits PUSCH, it will transmit according to the eLAA configuration information provided in the 4-bit indicator from eNB 105a.

In eLAA, the common PDCCH (CPDCCH), which may be transmitted separately for each carrier in each subframe, generally includes an uplink burst offset and an uplink burst duration indication to signal the eLAA uplink information. In eLAA, a special subframe also exists in which a downlink partial subframe is transmitted and SRS is transmitted in symbol 13. In muLTEfire, a special subframe also exists in which sPUCCH, sPRACH, etc., can be transmitted currently. As the eLAA technology advances, a partial UpPTS may also be defined within these partial special subframes. In an additional aspect of the present disclosure, identifying the existence of these special subframes may be incorporated in the signaling. Referring again to FIG. 7, the communication configuration of SCell between eNB 105b and UE 115 includes a partial special subframe 701. Thus, partial special subframe 701 includes a downlink portion and after the downlink portion a partial uplink portion may also be defined. In communications with UE 115, eNB 105*b* transmits its CPDCCH which includes an indicator that identifies the current subframe, partial special subframe 701, as a partial subframe and also indicates that this is a subframe before the start of the uplink burst at 702. On receiving this partial subframe indicator from eNB 105*b*, UE 115 may assume that this subframe contains partial uplink portion. If UE 115 is scheduled for uplink transmissions, then it may begin transmissions in this partial uplink portion. Otherwise, other UEs may be allowed to transmit in this partial uplink portion.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8A and 8B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed h a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and lulu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC, or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving a resource allocation for a contiguous transmission over a set of subframes on a secondary carrier including contention-based shared spectrum;
initiating transmission on the secondary carrier;
pausing transmission on the secondary carrier prior to completion of the contiguous transmission over the set of subframes of the resource allocation;
detecting activity or no activity on the secondary carrier during the pausing;
if activity was detected on the secondary carrier during the pausing, resuming, in response to a successful full listen before talk (LBT) check, transmission of the contiguous transmission on the secondary carrier after the pausing; and
if no activity was detected on the second carrier during the pausing, resuming, in response to a successful reduced LBT check, transmission of the contiguous transmission on the secondary carrier after the pausing;
wherein the resuming reoccupies the secondary carrier without start of a new channel occupancy of the secondary carrier.

2. The method of claim 1, wherein the pausing the transmission includes:
dropping the transmission based on a power-limited mode of operation.

3. The method of claim 1, further including:
receiving an LBT type indicator from a serving base station, wherein the type indicator identifies a type of LBT procedure performed by the serving base station for securing the secondary carrier for allocation of the contiguous transmission, and wherein the resuming the transmission is in response to an LBT procedure performed according to the LBT type indicator received from the serving base station.

4. The method of claim 3, wherein the type of LBT procedure includes one of:
a full LBT check; or
a reduced LBT check.

5. The method of claim 3, further including:
detecting activity on the carrier during the pausing.

6. The method of claim 5, further including:
ignoring the LBT type indicator when the LBT type indicator identifies a reduced LBT check performed by the serving base station, in response to the detecting the activity.

7. An apparatus configured for wireless communication, the apparatus comprising:
at least one processor; and
a memory coupled to the at least one processor,
wherein the at least one processor is configured to:
receive a resource allocation for a contiguous transmission over a set of subframes on a secondary carrier including contention-based shared spectrum;
initiate transmission on the secondary carrier;
detect activity or no activity on the secondary carrier during the pausing;
pause transmission on the secondary carrier prior to completion of the contiguous transmission over the set of subframes of the resource allocation;
if activity was detected on the secondary carrier during the pausing, resume, in response to a successful full listen before talk (LBT) check, transmission of the contiguous transmission on the secondary carrier after the pause; and
if no activity was detected on the second carrier during the pausing, resume, in response to a successful reduced LBT check, transmission of the contiguous transmission on the secondary carrier after the pausing;
wherein the at least on processor configured to resume transmission reoccupies the secondary carrier without start of a new channel occupancy of the secondary carrier.

8. The apparatus of claim 7, wherein the configuration of the at least one processor to pause the transmission includes configuration of the at least one processor to:
drop the transmission based on a power-limited mode of operation.

9. The apparatus of claim 7, further including configuration of the at least one processor to:
receive an LBT type indicator from a serving base station, wherein the type indicator identifies a type of LBT procedure performed by the serving base station for securing the secondary carrier for allocation of the contiguous transmission, and wherein resuming the transmission the transmission is in response to an LBT procedure performed according to the LBT type indicator received from the serving base station.

10. The apparatus of claim 9, wherein the type of LBT procedure includes one of:
a full LBT check; or
a reduced LBT check.

11. The apparatus of claim 9, further including configuration of the at least one processor to:
detect activity on the carrier during the pause of the transmission.

12. The apparatus of claim 11, further including configuration of the at least one processor to:
ignore the LBT type indicator when the LBT type indicator identifies a reduced LBT check performed by the serving base station, in response to detecting the activity.

13. A non-transitory computer-readable medium storing code for wireless communication, the code comprising instructions executable to:
receive a resource allocation for a contiguous transmission over a set of subframes on a secondary carrier including contention-based shared spectrum;
initiate transmission on the secondary carrier;
pause transmission on the secondary carrier prior to completion of the contiguous transmission over the set of subframes of the resource allocation;
detect activity or no activity on the secondary carrier during the pausing;
if activity was detected on the secondary carrier during the pause, resume, in response to a successful full listen before talk (LBT) check, transmission of the contiguous transmission on the secondary carrier after the pausing; and
if no activity was detected on the second carrier during the pause, resume, in response to a successful reduced LBT check, transmission of the contiguous transmission on the secondary carrier after the pausing;
wherein the instruction executable to resume reoccupies the secondary carrier without start of a new channel occupancy of the secondary carrier.

14. The non-transitory computer-readable medium of claim 13, wherein the instructions executable to pause includes instructions executable to drop the transmission based on a power-limited mode of operation.

15. The non-transitory computer-readable medium of claim 13, wherein the code further comprises instructions executable to:
- receive an LBT type indicator from a serving base station, wherein the type indicator identifies a type of LBT procedure performed by the serving base station for securing the secondary carrier for allocation of the contiguous transmission, and wherein the resuming the transmission is in response to an LBT procedure performed according to the LBT type indicator received from the serving base station.

16. The non-transitory computer-readable medium of claim 15, wherein the type of LBT procedure includes one of:
- a full LBT check; or
- a reduced LBT check.

17. The non-transitory computer-readable medium of claim 15, wherein the code further comprises instructions executable to detect activity on the carrier during the pausing.

18. The non-transitory computer-readable medium of claim 17, wherein the code further comprises instructions executable to ignore the LBT type indicator when the LBT type indicator identifies a reduced LBT check performed by the serving base station, in response to the detecting the activity.

* * * * *